United States Patent
Chu et al.

(10) Patent No.: US 6,813,342 B1
(45) Date of Patent: Nov. 2, 2004

(54) IMPLICIT AREA CODE DETERMINATION DURING VOICE ACTIVATED DIALING

(75) Inventors: Wesley Allen Chu, San Carlos, CA (US); Susan Yeh Yung, Menlo Park, CA (US); Ryan J. Bush, San Francisco, CA (US)

(73) Assignee: BeVocal, Inc., Mountain View, CA (US)

( * ) Notice: Subject to any disclaimer, the term of this patent is extended or adjusted under 35 U.S.C. 154(b) by 144 days.

(21) Appl. No.: 09/982,450

(22) Filed: Oct. 17, 2001

(51) Int. Cl.[7] ............... H04M 1/64; H04M 1/56; H04M 3/42

(52) U.S. Cl. ............... 379/88.01; 379/88.02; 379/88.03; 379/88.19; 379/142.08; 379/201.01; 379/207.15

(58) Field of Search ............... 379/67.1, 69, 70, 379/88.01, 88.02, 88.03, 88.04, 88.12, 88.17, 88.18, 88.19, 88.21, 142.08, 142.1, 201.01, 201.02, 201.11, 207.13, 207.14, 207.15

(56) References Cited

U.S. PATENT DOCUMENTS

| | | | | |
|---|---|---|---|---|
| 6,134,319 A | * | 10/2000 | Burg et al. | 379/354 |
| 6,154,526 A | * | 11/2000 | Dahlke et al. | 379/88.03 |
| 6,345,095 B1 | * | 2/2002 | Yamartino | 379/355.08 |
| 2002/0076009 A1 | * | 6/2002 | Denenberg et al. | 379/88.03 |

* cited by examiner

Primary Examiner—Allan Hoosain

(57) ABSTRACT

A system, method and computer program product are provided for determining an area code during voice activated dialing. Initially, utterances are received from the user during a session via a speech recognition portal. Such utterances are indicative of a third party. A speech recognition process is then performed on the utterances to interpret the utterances. A phone number is then identified based on the utterances. It is then determined whether the phone number includes an area code. If it is determined that the phone number does not include an area code, the area code is inferred. The inferred area code may then be outputted to the user. The user is then prompted to confirm the inferred area code. The phone number is then dialed with the inferred area code upon the receipt of confirmation from the user.

21 Claims, 8 Drawing Sheets

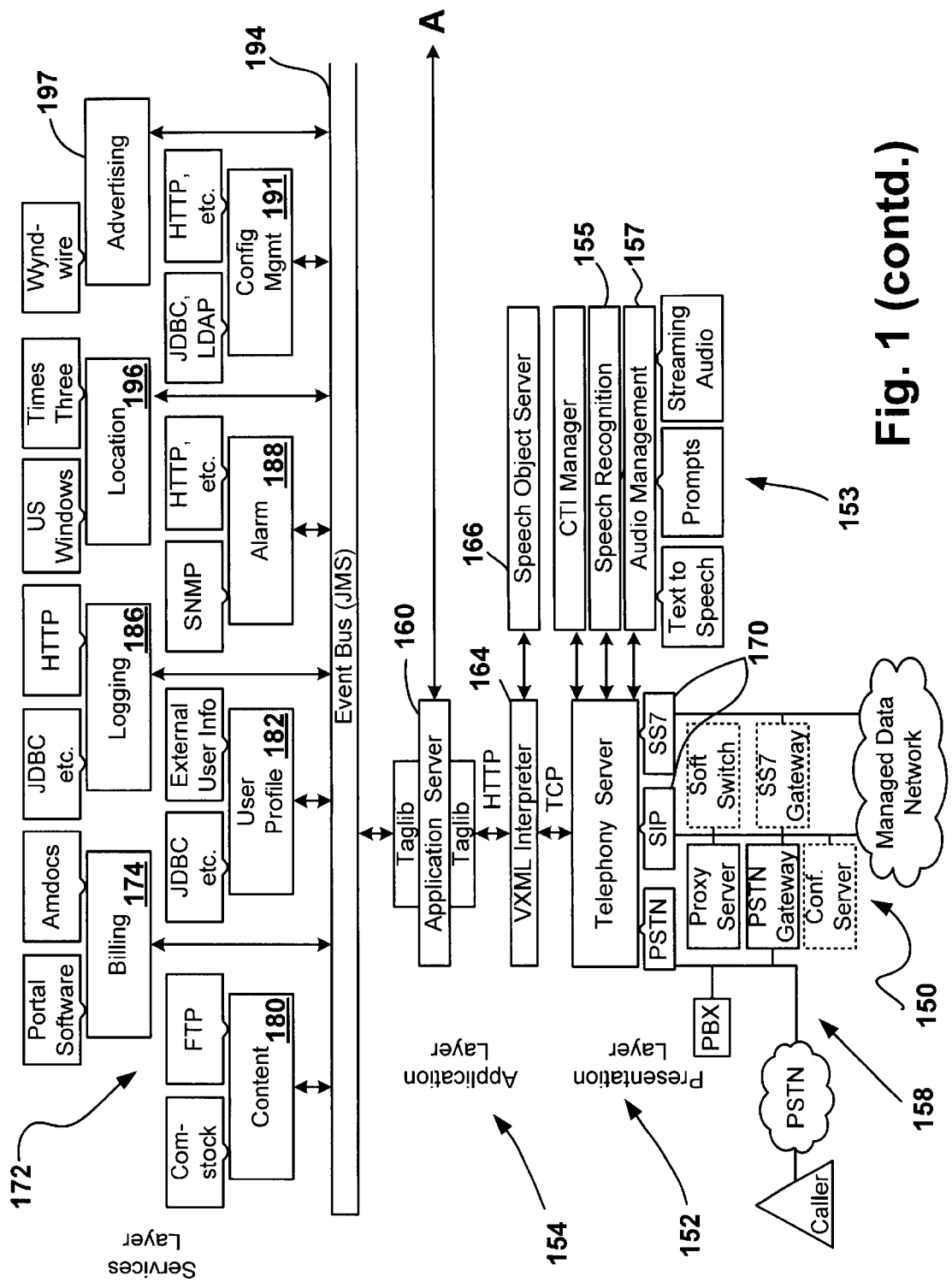
Fig. 1 (contd.)

US 6,813,342 B1

IMPLICIT AREA CODE DETERMINATION DURING VOICE ACTIVATED DIALING

FIELD OF THE INVENTION

The present invention relates to voice-activated dialing, and more particularly to ascertaining an area code during voice-activated dialing.

BACKGROUND OF THE INVENTION

Both rotary and touch-tone dialing rely on telephone numbers to initiate desired telephone connections. Telephone companies use the numbers to route calls, but people now depend on the numbers for all telephone communications. This is somewhat unnatural because people generally select those with whom they would like to talk by name or other convention. Indeed, telephone directories are arranged by name, not number.

Some companies started to develop voice-activated dialing systems to replace touch-tone dialing. In such systems, telephone users speak the name of an individual or destination into the microphone of a telephone handset to initiate a telephone call. Voice activated dialing, or voice-dialing, thus allows connection to be made directly, avoiding the step of looking up names to locate corresponding telephone numbers.

Examples of experimental voice-dialing systems appear in L. R. Rabiner, J. G. Wilpon, and A. E. Rosenberg, "A voice-controlled, repertory-dialer system," Bell System Technical Journal, Vol. 59, No. 7 (September, 1980), and U.S. Pat. No. 4,348,550 to Pirz et al. These systems have limited accuracy and speed and cost a great deal of money. Recent advances in speech recognition have improved performance dramatically, particularly for systems that are not trained to a particular speaker that have, until recently, performed worse than systems trained to particular speakers. In addition, the increasing computational and memory capacity and decreasing cost of computing hardware improve the commercial viability for simpler applications of speech recognition such as voice-dialing.

Limitations on the performance of voice-dialing systems, however, still significantly reduce their commercial applicability. For example, difficulty arises when an area code is not known for a particular party to be called. This can lead to problems in establishing the appropriate connection, especially if the area code is inferred incorrectly. There is thus a need for a technique of correctly inferring an area code associated with a party to be called during a voice-dialing session.

DISCLOSURE OF THE INVENTION

A system, method and computer program product are provided for determining an area code during voice activated dialing. Initially, utterances are received from the user during a session via a speech recognition portal. Such utterances are indicative of a third party. A speech recognition process is then performed on the utterances to interpret the utterances. A phone number is then identified based on the utterances. It is then determined whether the phone number includes an area code. If it is determined that the phone number does not include an area code, the area code is inferred. The inferred area code may then be outputted to the user. The user is then prompted to confirm the inferred area code. The phone number is then dialed with the inferred area code upon the receipt of confirmation from the user.

In one embodiment, a log-in process is initiated. Such log-in process may include collecting a caller identifier. Further, the user may be identified in a database utilizing the caller identifier. It is then determined if the user can be identified in the database based on the caller identifier. If so, a user identifier may then be identified in the database based on the caller identifier.

The log-in process may further include prompting the user to enter a user identifier upon it being determined that the user can not be identified in the database based on the caller identifier.

With the caller identifier and the user identifier collected, an address book associated with the user may be retrieved based on the user identifier. It is then determined whether the utterances indicative of the third party are representative of a name of the third party. If so, the phone number associated with the name may then be looked up in the address book. In the alternative, it may be determined that the utterances indicative of the third party are representative of a phone number of the third party.

In any case, it is then ascertained whether the phone number includes 10-digits. If so, the phone number may simply be dialed.

If, however, the phone number includes 7-digits, it is determined whether the caller identifier is valid. If so, an area code of the phone number is inferred from the caller identifier. If not, the area code is inferred from the user identifier. It should be noted that the user identifier includes a phone number of the user.

DESCRIPTION OF THE PREFERRED EMBODIMENTS

Figure 1:
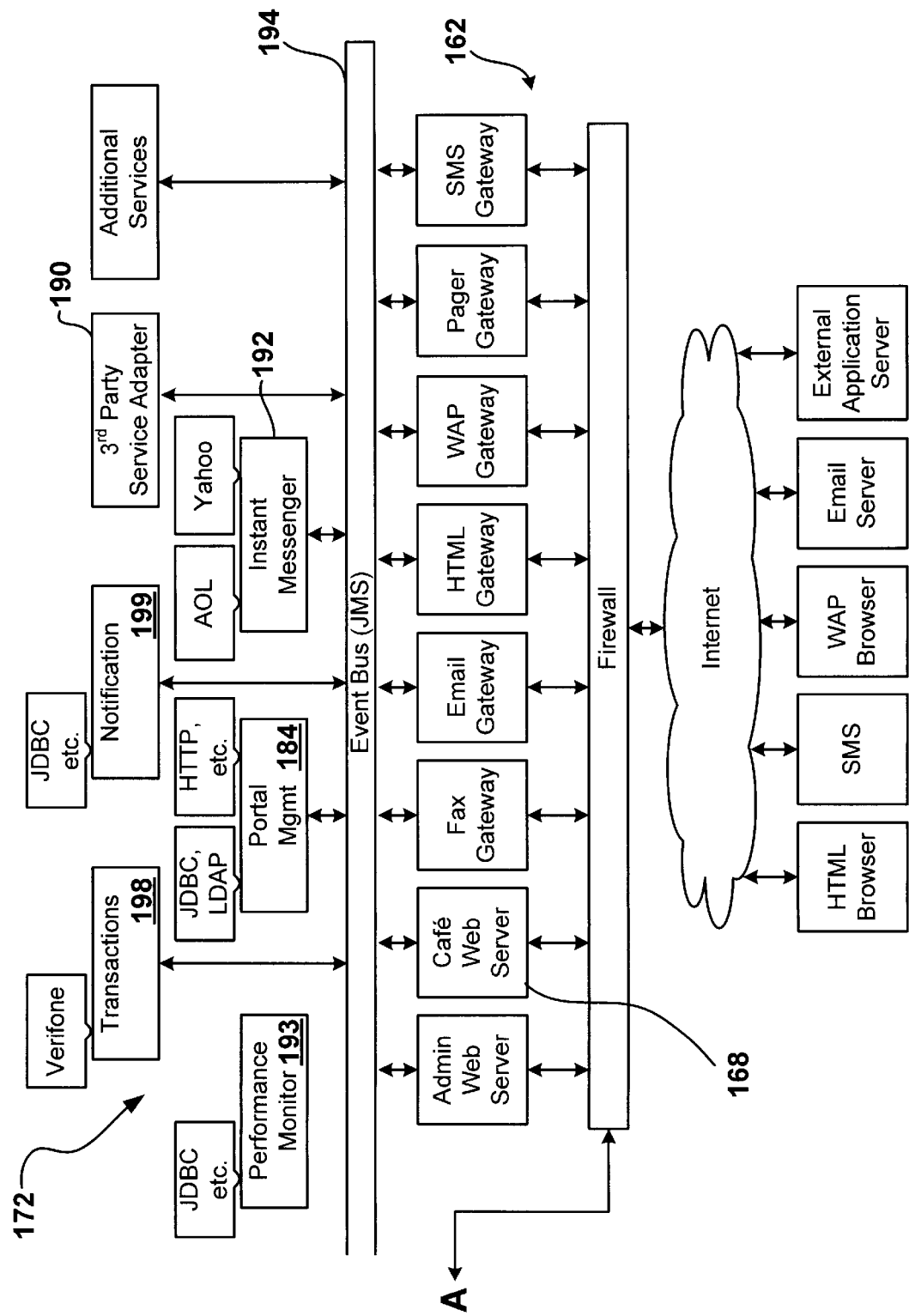
FIG. 1 illustrates an exemplary environment in which the present invention may be implemented.

FIG. 1 illustrates one exemplary platform 150 on which the present invention may be implemented. The present platform 150 is capable of supporting voice applications that provide unique business services. Such voice applications may be adapted for consumer services or internal applications for employee productivity.

The present platform of FIG. 1 provides an end-to-end solution that manages a presentation layer 152, application logic 154, information access services 156, and telecom infrastructure 159. With the instant platform, customers can build complex voice applications through:a suite of customized applications and a rich development tool set on an application server 160. The present platform 150 is capable of deploying applications in a reliable, scalable manner, and maintaining the entire system through monitoring tools.

The present platform 150 is multi-modal in that it facilitates information delivery via multiple mechanisms 162, i.e. Voice, Wireless Application Protocol (WAP), Hypertext Mark-up Language (HTML), Facsimile, Electronic Mail, Pager, and Short Message Service (SMS). It further includes a VoiceXML interpreter 164 that is fully compliant with the VoiceXML 1.0 specification, written entirely in Java®, and supports Nuance® SpeechObjects 166.

Yet another feature of the present platform 150 is its modular architecture, enabling "plug-and-play" capabilities. Still yet, the instant platform 150 is extensible in that developers can create their own custom services to extend the platform 150. For further versatility, Java® based components are supported that enable rapid development, reliability, and portability. Another web server 168 supports a web-based development environment that provides a comprehensive set of tools and resources which developers may need to create their own innovative speech applications.

Support for SIP and SS7 (Signaling System 7) is also provided. Backend Services 172 are also included that provide value added functionality such as content management 180 and user profile management 182. Still yet, there is support for external billing engines 174 and integration of leading edge technologies from Nuance®, Oracle®, Cisco®, Natural Microsystems®, and Sun Microsystems®.

More information will now be set forth regarding the application layer 154, presentation layer 152, and services layer 156.

Application Layer (154)

The application layer 154 provides a set of reusable application components as well as the software engine for their execution. Through this layer, applications benefit from a reliable, scalable, and high performing operating environment. The application server 160 automatically handles lower level details such as system management, communications, monitoring, scheduling, logging, and load balancing. Some optional features associated with each of the various components of the application layer 154 will now be set forth.

Application Server (160)

A high performance web/JSP server that hosts the business and presentation logic of applications.

High performance, load balanced, with failover.

Contains reusable application components and ready to use applications.

Hosts Java Servlets and JSP's for custom applications.

Provides easy to use taglib access to platform services.

VoiceXML Interpreter (164)

Executes VoiceXML applications

VoiceXML 1.0 compliant

Can execute applications hosted on either side of the firewall.

Extensions for easy access to system services such as billing.

Extensible—allows installation of custom VoiceXML tag libraries and speech objects.

Provides access to SpeechObjects 166 from VoiceXML.

Integrated with debugging and monitoring tools.

Written in Java®.

Speech Objects Server (166)

Hosts SpeechObjects, based components.

Provides a platform for running SpeechObjects based applications.

Contains a rich library of reusable SpeechObjects.

Services Layer (156)

The services layer 156 simplifies the development of voice applications by providing access to modular value-added services. These backend modules deliver a complete set of functionality, and handle low level processing such as error checking. Examples of services include the content 180, user profile 182, billing 174, and portal management 184 services. By this design, developers can create high performing, enterprise applications without complex programming. Some optional features associated with each of the various components of the services layer 156 will now be set forth.

Content (180)

Manages content feeds and databases such as weather reports, stock quotes, and sports.

Ensures content is received and processed appropriately.

Provides content only upon authenticated request.

Communicates with logging service 186 to track content usage for auditing purposes.

Supports multiple, redundant content feeds with automatic failover.

Sends alarms through alarm service 188.

User Profile (182)

Manages user database

Can connect to a $3^{rd}$ party user database 190. For example, if a customer wants to leverage his/her own user database, this service will manage the connection to the external user database.

Provides user information upon authenticated request.

Alarm (188)

Provides a simple, uniform way for system components to report a wide variety of alarms.

Allows for notification (Simply Network Management Protocol (SNMP), telephone, electronic mail, pager, facsimile, SMS, WAP push, etc.) based on alarm conditions.

Allows for alarm, management (assignment, status tracking, etc) and integration with trouble ticketing and/or belpdesk systems.

Allows for integration of alarms into customer premise environments.

Configuration Management (191)

Maintains the configuration of the entire system.

Performance Monitor (193)

Provides real time monitoring of entire system such as number of simultaneous users per customer, number of users in a given application, and the uptime of the system.

Enables customers to determine performance of system at any instance.

Portal Management (184)

The portal management service 184 maintains information on the configuration of each voice portal and enables customers to electronically administer their voice portal through the administration web site.

Portals can be highly customized by choosing from multiple applications and voices. For example, a customer can configure different packages of applications i.e. a basic package consisting of 3 applications for $4.95, a deluxe package consisting of 10 applications for $9.95, and premium package consisting of any 20 applications for $14.95.

Instant Messenger (192)

Detects when users are "on-line" and can pass messages such as new voicemails and e-mails to these users.

Billing (174)

Provides billing infrastructure such as capturing and processing billable events, rating, and interfaces to external billing systems.

Logging (186)

Logs all events sent over the JMS bus 194. Examples include User A of Company ABC accessed Stock Quotes, application server 160 requested driving directions from content service 180, etc.

Location (196)

Provides geographic location of caller.

Location service sends a request to the wireless carrier or to a location network service provider such as TimesThree® or US Wireless. The network provider responds with the geographic location (accurate within 75 meters) of the cell phone caller.

Advertising (197)

Administers the insertion of advertisements within each call. The advertising service can deliver targeted ads based on user profile information.

Interfaces to external advertising services such as Wyndwire® are provided.

Transactions (198)

Provides transaction infrastructure such as shopping cart, tax and shipping calculations, and interfaces to external payment systems.

Notification (199)

Provides external and internal notifications based on a timer or on external events such as stock price movements. For example, a user can request that he/she receive a telephone call every day at 8 AM.

Services can request that they receive a notification to perform an action at a predetermined time. For example, the content service 180 can request that it receive an instruction every night to archive old content.

3$^{rd}$ Party Service Adapter (190)

Enables 3$_{rd}$ parties to develop and use their own external services. For instance, if a customer wants to leverage a proprietary system, the 3$_{rd}$ party service adapter can enable it as a service that is available to applications.

Presentation Layer (152)

The presentation layer 152 provides the mechanism for communicating with the end user. While the application layer 154 manages the application logic, the presentation layer 152 translates the core logic into a medium that a user's device can understand. Thus, the presentation layer 152 enables multi-modal support. For instance, end users can interact with the platform through a telephone, WAP session, HTML session, pager, SMS, facsimile, and electronic mail. Furthermore, as new "touchpoints" emerge, additional modules can seamlessly be integrated into the presentation layer 152 to support them.

Telephony Server (158)

The telephony server 158 provides the interface between the telephony world, both Voice over Internet Protocol (VoIP) and Public Switched Telephone Network (PSTN), and the applications running on the platform. It also provides the interface to speech recognition and synthesis engines 153. Through the telephony server 158, one can interface to other 3$_{rd}$ party application servers 190 such as unified messaging and conferencing server. The telephony server 158 connects to the telephony switches and "handles" the phone call.

Features of the telephony server 158 include:

Mission critical reliability.

Suite of operations and maintenance tools.

Telephony connectivity via ISDN/T1/E1, SIP and SS7 protocols.

DSP-based telephony boards offload the host, providing real-time echo cancellation, DTMF & call progress detection, and audio compression/decompression.

Speech Recognition Server (155)

The speech recognition server 155 performs speech recognition on real time voice streams from the telephony server 158. The speech recognition server 155 may support the following features:

Carrier grade scalability & reliability

Large vocabulary size

Industry leading speaker independent recognition accuracy

Recognition enhancements for wireless and hands free callers

Dynamic grammar support—grammars can be added during run time.

Multi-language support

Barge in—enables users to interrupt voice applications. For example, if a user hears "Please say a name of a football team that you," the user can interject by saying "Miami Dolphins" before the system finishes.

Speech objects provide easy to use reusable components

"On the fly" grammar updates

Speaker verification

Audio Manager (157)

Manages the prompt server, text-to-speech server, and streaming audio.

Prompt Server (153)

The Prompt server is responsible for caching and managing pre-recorded audio files for a pool of telephony servers.

Text-to-Speech Server (153)

When pre-recorded prompts are unavailable, the text-to-speech server is responsible for transforming text input into audio output that can be streamed to callers on the telephony server 158. The use of the TTS server offloads the telephony server 158 and allows pools of TTS resources to be shared across several telephony servers. Features include:

- Support for industry leading technologies such as SpeechWorks® Speechify® and L&H RealSpeak®.
- Standard Application Program Interface (API) for integration of other TTS engines.

Streaming Audio

The streaming audio server enables static and dynamic audio files to be played to the caller. For instance, a one minute audio news feed would be handled by the streaming audio server.

- Support for standard static file formats such as WAV and MP3
- Support for streaming (dynamic) file formats such as Real Audio® and Windows® Media®.

PSTN Connectivity

Support for standard telephony protocols like ISDN, E&M WinkStart®, and various flavors of E1 allow the telephony server 158 to connect to a PBX or local central office.

SIP Connectivity

The platform supports telephony signaling via the Session Initiation Protocol (SIP). The SIP signaling is independent of the audio stream, which is typically provided as a G.711 RTP stream. The use of a SIP enabled network can be used to provide many powerful features including:

- Flexible call routing
- Call forwarding
- Blind & supervised transfers
- Location/presence services
- Interoperable with SIP compliant devices such as soft switches
- Direct connectivity to SIP enabled carriers and networks
- Connection to SS7 and standard telephony networks (via gateways)

Admin Web Server

Serves as the primary interface for customers..

- Enables portal management services and provides billing and simple reporting information. It also permits customers to enter problem ticket orders, modify application content such as advertisements, and perform other value added functions.
- Consists of a website with backend logic tied to the services and application layers. Access to the site is limited to those with a valid user id and password and to those coming from a registered IP address. Once logged in, customers are presented with a homepage that provides access to all available customer resources.

Other (168)

Web-based development environment that provides all the tools and resources developers need to create their own speech applications.

Provides a VoiceXML Interpreter that is:

Compliant with the VoiceXML 1.0 specification.

Compatible with compelling, location-relevant SpeechObjects—including grammars for nationwide US street addresses.

Provides unique tools that are critical to speech application development such as a vocal player. The vocal player addresses usability testing by giving developers convenient access to audio files of real user interactions with their speech applications. This provides an invaluable feedback loop for improving dialogue design.

WAP, HTML, SMS, Email, Pager, and Fax Gateways

Provide access to external browsing devices.

Manage (establish, maintain, and terminate) connections to external browsing and output devices.

Encapsulate the details of communicating with external device.

Support both input and output on media where appropriate. For instance, both input from and output to WAP devices.

Reliably deliver content and notifications.

Figure 2:
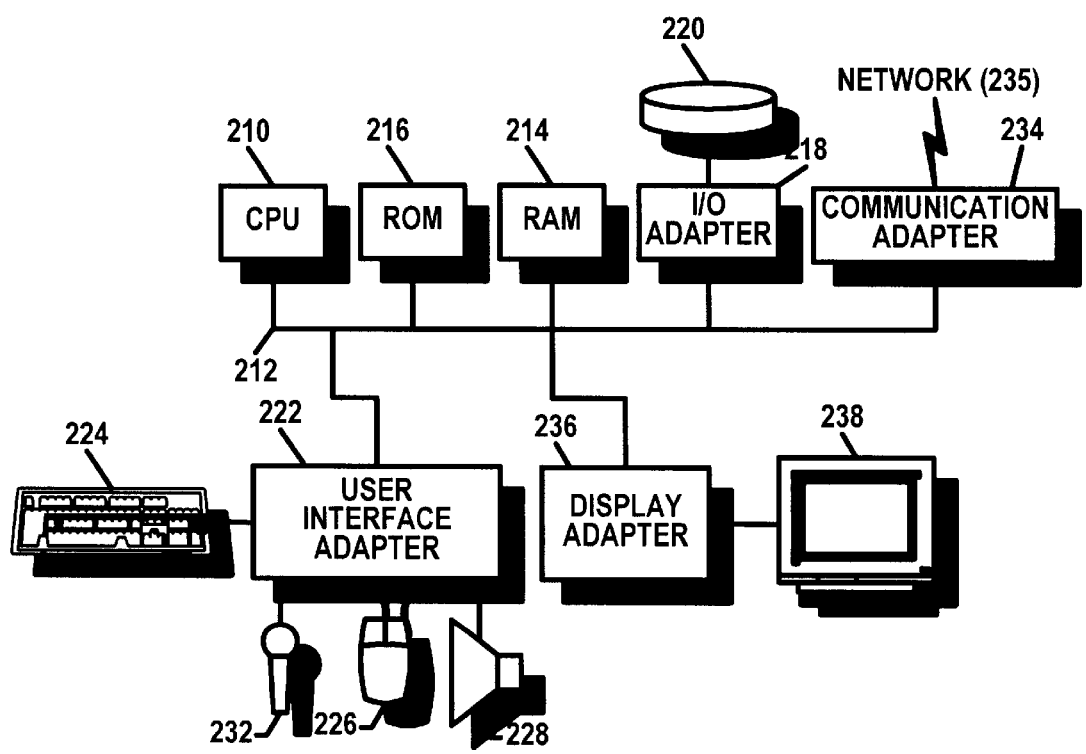
FIG. 2 shows a representative hardware environment associated with the various components of FIG. 1.

FIG. 2 shows a representative hardware environment associated with the various systems, i.e. computers, servers, etc., of FIG. 1. FIG. 2 illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system.. Those skilled in the art will appreciate that the present invention may also be implemented on platforms and operating systems other than those mentioned.

Figure 3:
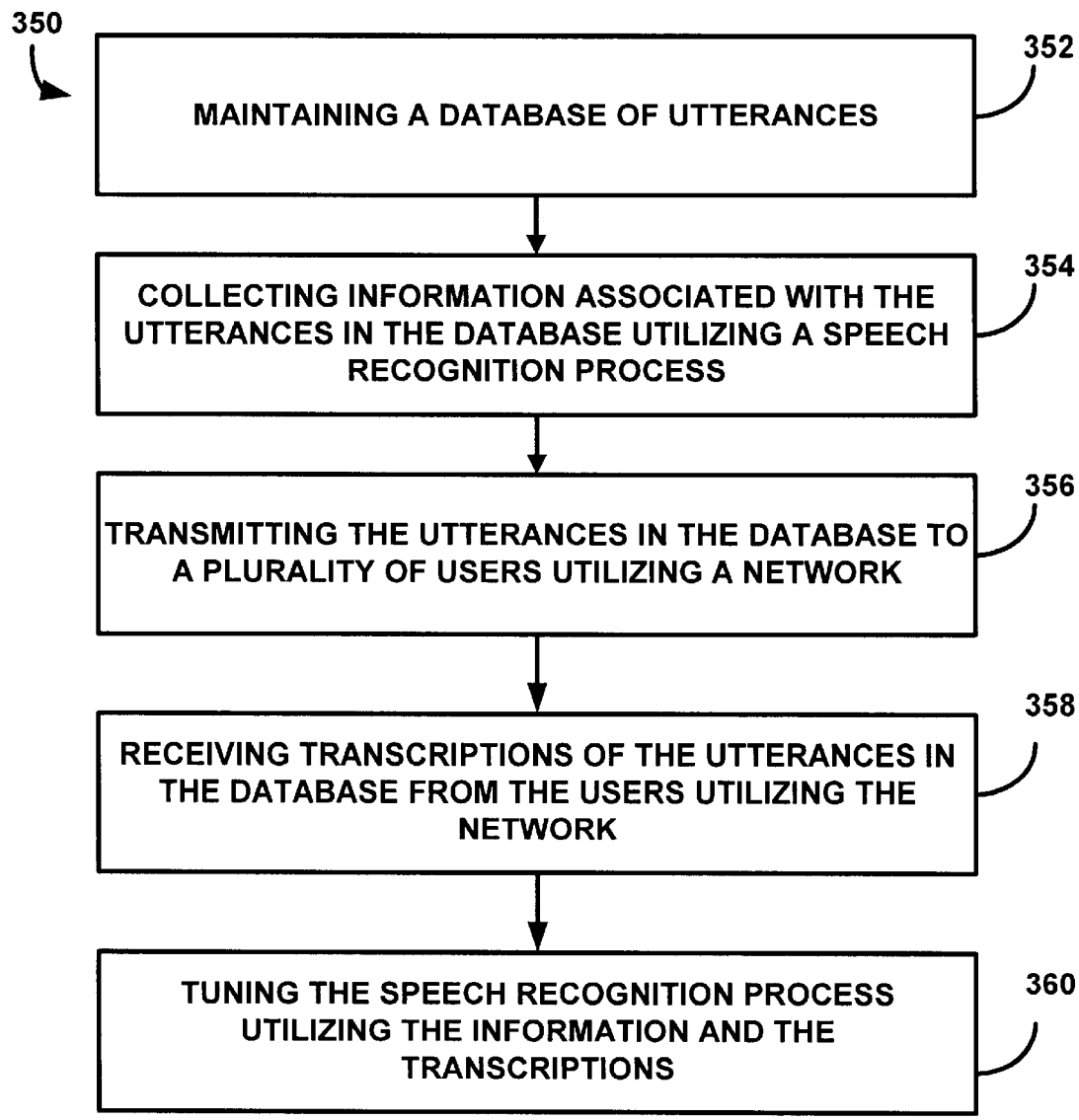
FIG. 3 illustrates a method for providing a speech recognition process utilizing the utterances collected during the method of FIG. 3.

FIG. 3 illustrates a method 350 for providing a speech recognition process utilizing the utterances collected during use of a voice portal. Initially, a database of the collected utterances is maintained. See operation 352. In operation 354, information associated with the utterances is collected utilizing a speech recognition process. When a speech recognition process application is deployed, audio data and recognition logs may be created. Such data and logs may also be created by simply parsing through the database at any desired time.

In one embodiment, a database record may be created for each utterance. Table 1 illustrates the various information that the record may include.

TABLE 1

Name of the grammar it was recognized against;
Name of the audio file on disk;
Directory path to that audio file;
Size of the file (which in turn can be used to calculate the length of the utterance if the sampling rate is fixed);
Session identifier;
Index of the utterance (i.e. the number of utterances said before in the same session);
Dialog state (identifier indicating context in the dialog flow in which recognition happened);
Recognition status (i.e. what the recognizer did with the utterance (rejected, recognized, recognizer was too slow);
Recognition confidence associated with the recognition result;
Recognition hypothesis;
Gender of the speaker;
Identification of the transcriber; and/or
Date the utterances were transcribed.

Inserting utterances and associated information in this fashion in the database (SQL database) allows instant visibility into the data collected. Table 2 illustrates the variety of information that may be obtained through simple queries.

TABLE 2

Number of collected utterances;
Percentage of rejected utterances for a given grammar;
Average length of an utterance;
Call volume in a give data range;
Popularity of a given grammar or dialog state; and/or
Transcription management (i.e. transcriber's productivity).

Further, in operation 356, the utterances in the database are transmitted to a plurality of users utilizing a network. As such, transcriptions of the utterances in the database may be received from the users utilizing the network. Note operation 358. As an option, the transcriptions of the utterances may be received from the users using a network browser.

Figure 4:
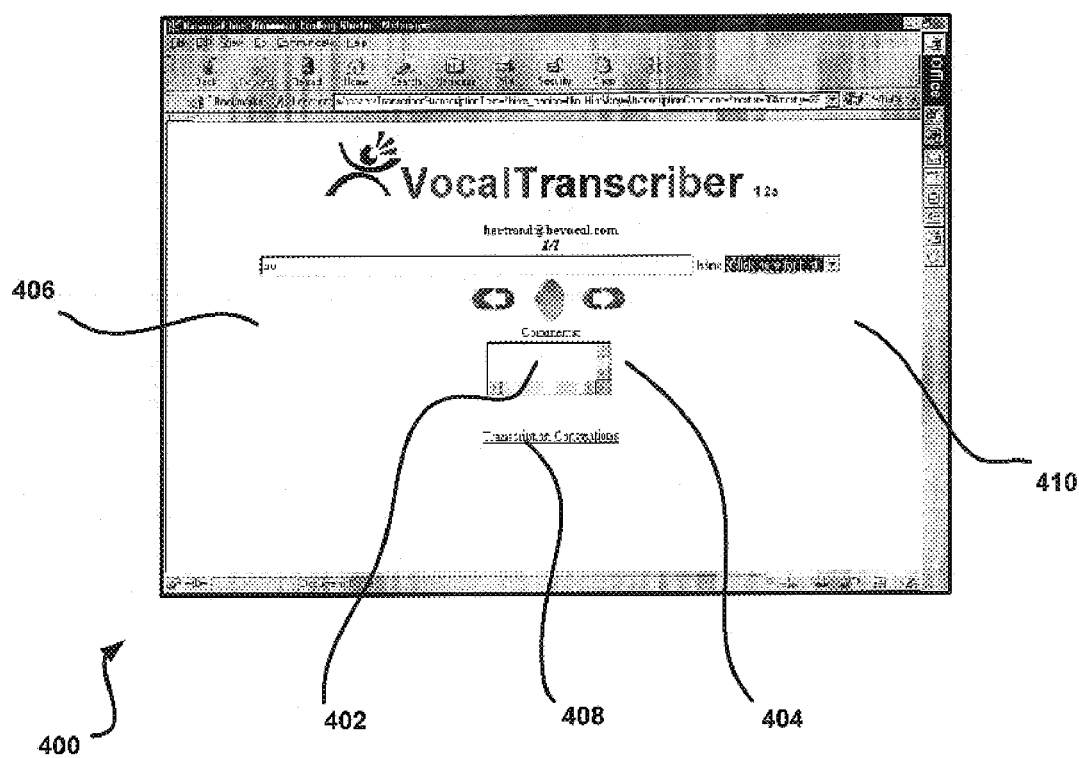
FIG. 4 illustrates a web-based interface which interacts with a database to enable and coordinate an audio transcription effort.

FIG. 4 illustrates a web-based interface 400 that may be used which interacts with the database to enable and coordinate the audio transcription effort. As shown, a speaker icon 402 is adapted for emitting a present utterance upon the selection thereof. Previous and next utterances may be queued up using selection icons 404. Upon the utterance being emitted, a local or remote user may enter a string corresponding to the utterance in a string field 406. Further, comments (re. transcriber's performance) may be entered regarding the transcription using a comment field 408. Such comments may be stored for facilitating the tuning effort, as will soon become apparent.

As an option, the web-based interface 400 may include a hint pull down menu 410. Such hint pull down menu 410 allows a user choose from a plurality of strings identified by the speech recognition process. This allows the transcriber to do a manual comparison between the utterance and the results of the speech recognition process. Comments regarding this analysis may also be entered in the comment field 408.

The web-based interface 400 thus allows anyone with a web-browser and a network connection to contribute to the tuning effort. During use, the interface 400 is capable of playing collected sound files to the authenticated user, and allows them to type into the browser what they hear. Making the transcription task remote simplifies the task of obtaining quality transcriptions of location specific audio data (street names, city names, landmarks). The order in which the utterances are fed to the transcribers can be tweaked by a transcription administrator (e.g. to favor certain grammars, or more recently collected utterances). This allows for the transcribers work to be focused on the areas needed.

Similar to the speech recognition process of operation 304 of FIG. 3, the present interface 400 of FIG. 4 and the transcription process contribute information for use Aduring subsequent tuning. Table 3 illustrates various fields of information that may be associated with each utterance record in the database.

TABLE 3

Date the utterance was transcribed;
Identifier of the transcriber;
Transcription text;
Transcription comments noting speech anomalies;
and/or
Gender identifier.

During operation, the database of utterances collected and maintained during the methods of FIG. 3 may be used to provide various services. Examples of various specific voice portal applications are set forth in Table 4. It should be noted that any services may be afforded per the desires of the user.

TABLE 4

Figure 5:
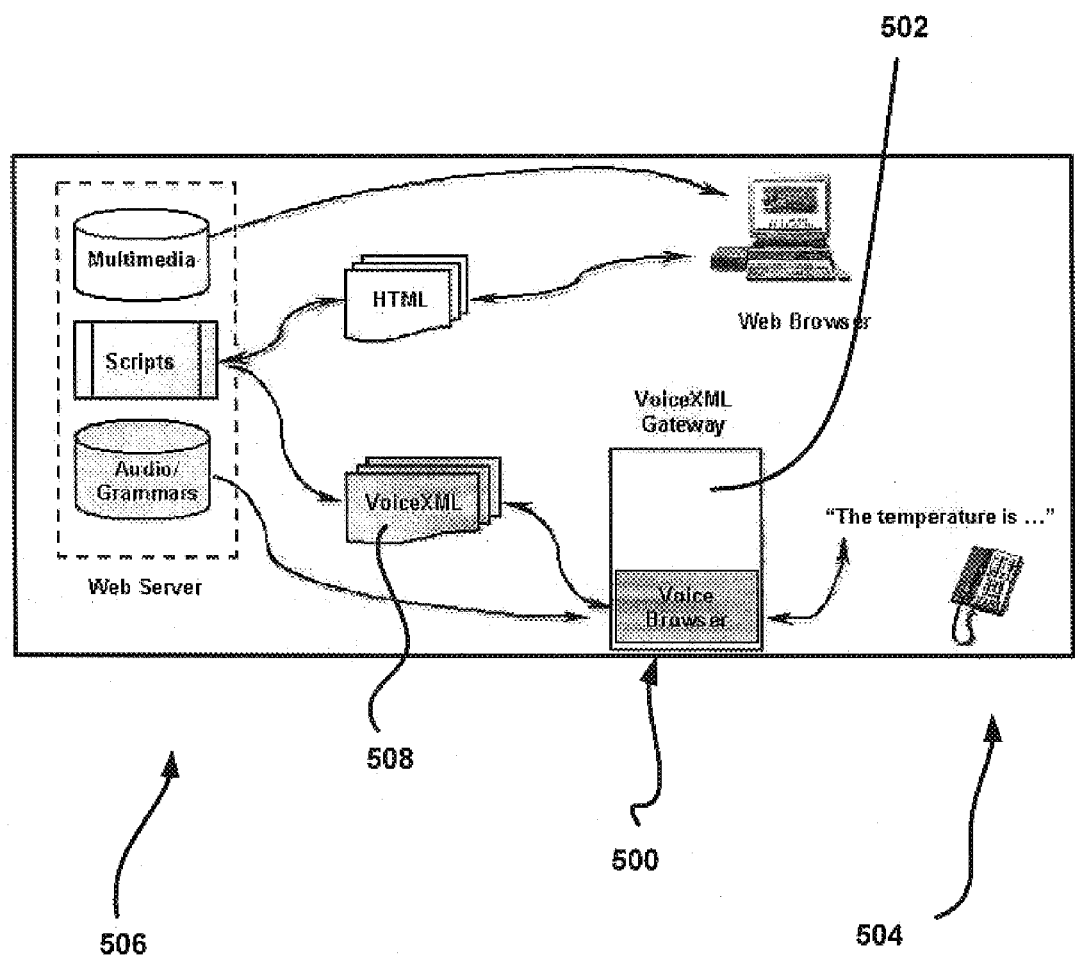
FIG. 5 is a schematic illustrating the manner in which VoiceXML functions, in accordance with one embodiment of the present invention.

Nationwide Business Finder - search engine for locating businesses representing popular brands demanded by mobile consumers.
Nationwide Driving Directions - point-to-point driving directions
Worldwide Flight Information - up-to-the-minute flight information on major domestic and international carriers
Nationwide Traffic Updates - real-time traffic information for metropolitan areas
Worldwide Weather - updates and extended forecasts throughout the world
News - audio feeds providing the latest national and world headlines, as well as regular updates for business, technology, finance, sports, health and entertainment news
Sports - up-to-the-minute scores and highlights from the NFL, Major League Baseball, NHL, NBA, college football, basketball, hockey, tennis, auto racing, golf, soccer and boxing
Stock Quotes - access to major indices and all stocks on the NYSE, NASDAQ, and AMEX exchanges
Infotainment - updates on soap operas, television dramas, lottery numbers and horoscopes FIG. 5 is a schematic illustrating the manner in which VoiceXML functions in the context of the aforementioned architecture to support a voice portal that provides services such as those of Table 4. As shown, a typical VoiceXML interpreter 500 runs on a specialized voice gateway node 502 that is connected both to the public switched telephone network 504 and to the Internet 506. As shown, VoiceXML 508 acts as an interface between the voice gateway node 502 and the Internet 506.

VoiceXML takes advantage of several trends:

The growth of the World-Wide Web and of its capabilities.

Improvements in computer-based speech recognition and text-to-speech synthesis.

The spread of the WWW beyond the desktop computer.

Voice application development is easier because VoiceXML is a high-level, domain-specific markup language, and because voice applications can now be constructed with plentiful, inexpensive, and powerful web application development tools.

VoiceXML is based on XML. XML is a general and highly flexible representation of any type of data, and various transformation technologies make it easy to map one XML structure to another, or to map XML into other data formats.

VoiceXML is an extensible markup language (XML) for the creation of automated speech recognition (ASR) and interactive voice response (IVR) applications. Based on the XML tag/attribute format, the VoiceXML syntax involves enclosing instructions (items) within a tag structure in the following manner:

```
<element_name attribute_name="attribute_value">... contained
   items ... </element_name>
```

A VoiceXML application consists of one or more text files called documents. These document files are denoted by a ".vxml" file extension and contain the various VoiceXML instructions for the application. It is recommended that the first instruction in any document to be seen by the interpreter be the XML version tag:

```
<?xml version="1.0"?>
```

The remainder of the document's instructions should be enclosed by the vxml tag with the version attribute set equal to the version of VoiceXML being used ("1.0" in the present case) as follows:

```
<vxml version="1.0">
```

Inside of the <vxml> tag, a document is broken up into discrete dialog elements.

Each element has a name and is responsible for executing some portion of the dialog. An element is denoted by the use of the <element> tag. Table 5 illustrates an exemplary list of element types available in one specification of VoiceXML.

Figure 6:
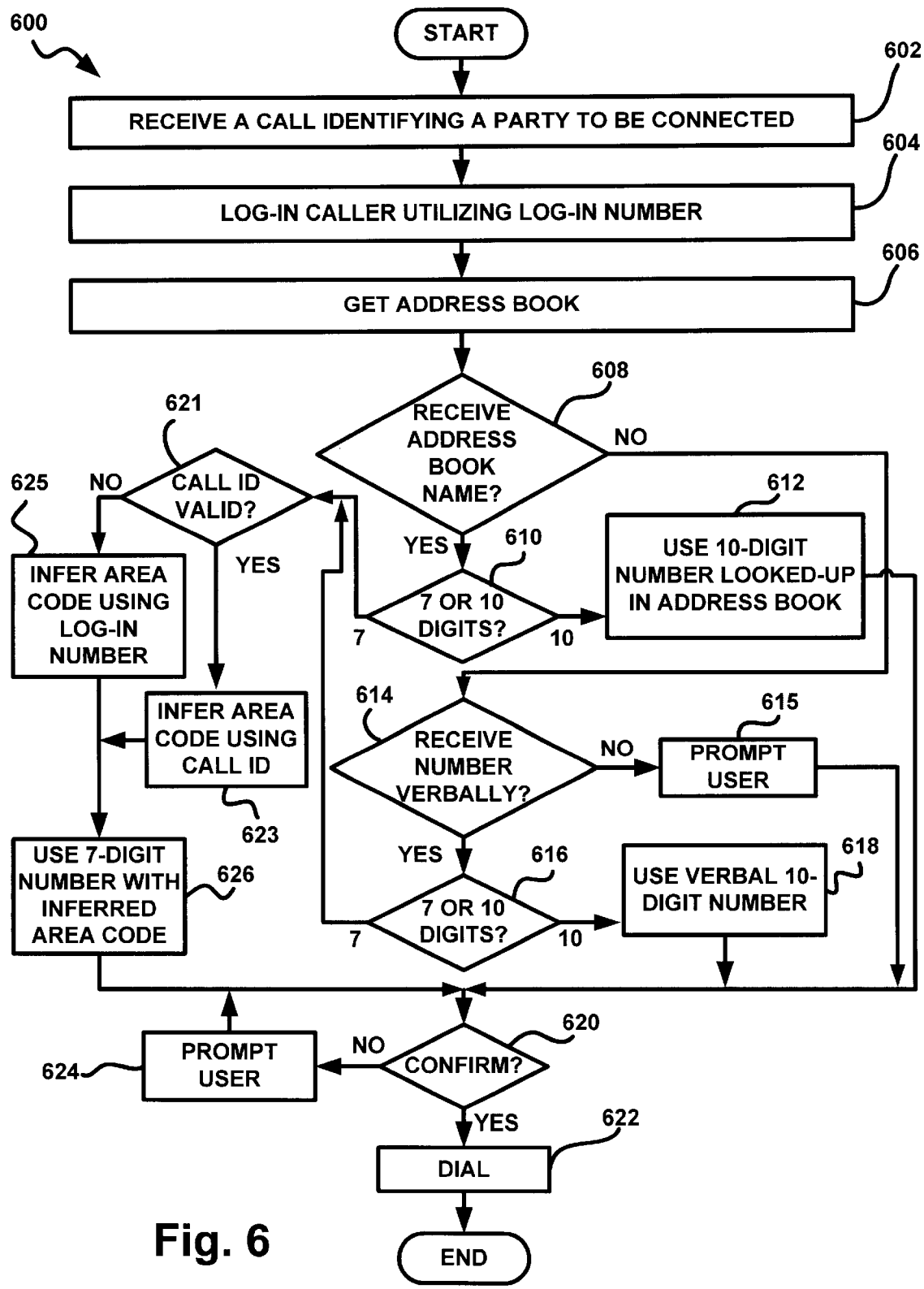
FIG. 6 illustrates a method for determining an area code during voice activated dialing, in accordance with one embodiment.

TABLE 5 element types:
<field> - gathers input from the user via speech or DTMF
recognition as defined by a grammar
<record> - records an audio clip from the user
<transfer> - transfers the user to another phone number
<object> - invokes a platform-specific object that may
gather user input, returning the result as an ECMAScript
object
<subdialog> - perfoms a call to another dialog or
document (similar to a function call), returning the
result as an ECMAScript object FIG. 6 illustrates a method 600 for inferring an area code during voice activated dialing, in accordance with one embodiment. In one embodiment, the present method 600 may be carried out in the context of the browser application 500 of FIG. 5 and the architecture of FIG. 1. It should be noted, however, that any type of application and architecture may be utilized per the desires of the user.

Initially, in operation 602, utterances are received from a user during a session via a speech recognition portal. Such speech recognition portal may be accessed during the course of a telephone call. As will soon become apparent, the utterances may be indicative of a third party to which the user desires to be connected. For example, the utterances may take the form a 7 or 10 digit phone number of the third party, or a name of the third party which, in turn, can be translated into a phone number utilizing an address book.

Of course, the telephone call may utilize any type of network such as a telecommunication network, the Internet, etc. Moreover, a speech recognition process may be performed on the utterances to interpret the utterances.

Next, in operation 604, a log-in process is initiated. More information on such log-in process will be set forth in greater detail during reference to FIG. 7. As will soon become apparent, the log-in process produces a caller identifier (i.e. call identification record) and a user identifier (i.e. log-in number).

In the context of the present description, the caller identifier refers to any information that is received with an incoming call. For example, conventional caller identifiers often include a calling party's phone number, etc. Moreover, the user identifier is any identifier that is capable being looked up in a database to gain additional information about the user. Such user identifier may be assigned during a registration process that may occur at an earlier time. In another embodiment, the user identifier may take the form of a phone number of the user for simplicity purposes.

In operation 606, an address book associated with the user is then retrieved after the user is identified during the log-in process. It should be noted that such address book may be constructed by a user in order to associate a plurality of phone numbers with names of persons. Moreover, the address book may be retrieved from a database utilizing the user identifier ascertained during the log-in process of operation 604. Table 6 illustrates an exemplary data structure associated with the address book.

TABLE 6

| Name1 | Phone number1 |
| Name2 | Phone number2 |
| Name3 | Phone number3 |
| Name4 | Phone number4 |
| Name5 | Phone number5 |

It may then be determined in decision 608 whether the utterances received in operation 602 are representative of a name of the third party. If so, the phone number associated with the name may then be looked up in the address book utilizing a data structure such as that of Table 6.

It is then ascertained whether the phone number looked up in the address book includes 10-digits. If so, the 10-digit phone number may simply be used in operation 612. In particular, the phone number may optionally be played back for confirmation by the user in decision 620. If confirmed with a "yes" or some other designated verbalization, the -phone number is dialed in operation 622. If no confirmation is received, the user may be prompted to verbalize a 10-digit phone number or simply the area code in operation 624 for subsequent confirmation again in decision 620.

In the alternative, it may be determined in decision 608 that the utterances indicative of the third party are representative of a phone number, not a name. See decisions 608 and 614. If not, the user is prompted to verbalize a 10-digit number in operation 615. If the utterances indicative of the third party are indeed representative of a phone number, it is then ascertained whether the phone number includes 10-digits in decision 616. If so, such phone number may simply be used in operation 618. Similar to before, the phone number may optionally be played back for confirmation by the user in decision 620. If confirmed with a "yes", the phone number may be dialed in operation 622. If no confirmation is received, the user may be prompted to verbalize the phone number or the area code in operation 624 for subsequent confirmation again in decision 620.

If, however, the phone number inspected in decisions 610 or 616 includes only 7-digits, an area code inference procedure is started. In particular, it is subsequently determined in decision 621 whether the caller identifier is valid. It is well known in the art that the caller identifier is not always reliable, and may even be non-existent.

If the caller identifier is valid, an area code of the phone number is inferred from the caller identifier. See operation 623. In particular, the first three digits (not including the "1" if present) of the calling party number indicated by the caller identifier may be used as the area code.

If the caller identifier is invalid, the area code is inferred from the user identifier in operation 625. In one embodiment where the user identifier includes a phone number of the user, the first three digits (not including the "1" if present) of the user identifier may be used as the area code. In another embodiment, the area code may be looked up in a database based on the user identifier.

After operations 623 and 625, the 7-digit phone number is used with the inferred area code. In particular, the phone number may optionally be played back for confirmation by the user in decision 620. If confirmed with a "yes" or some other designated verbalization, the phone number is dialed in operation 622. If no confirmation is received, the user may be prompted to verbalize the phone number or the area code in operation 624 for subsequent confirmation again in decision 620. Of course, the phone number including area code may be played back for being optionally denied by the user, with a default action of dialing the number if there is no response by the user.

Figure 7:
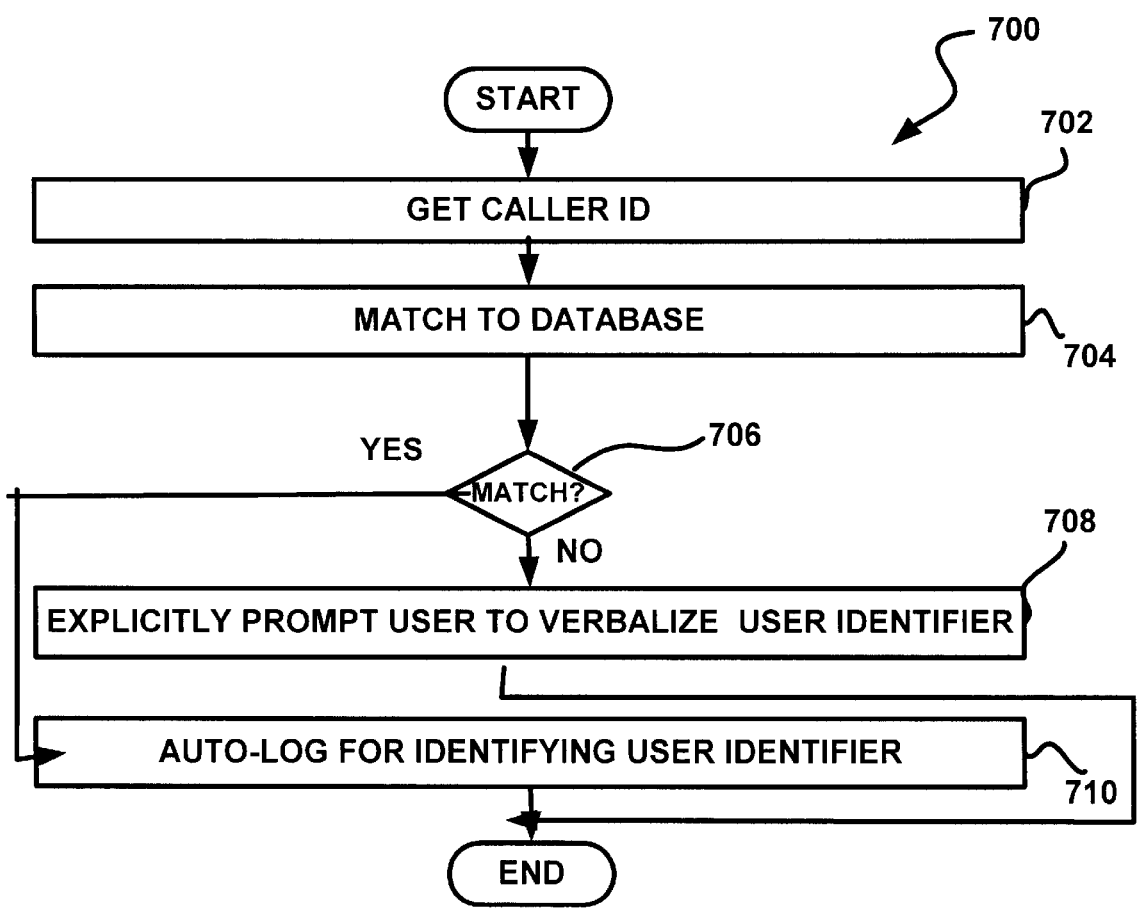
FIG. 7 illustrates a method for logging in a user during voice activated dialing, in accordance with one embodiment.

FIG. 7 illustrates a method 700 for logging in a user during voice activated dialing, in accordance with operation 604 of FIG. 6. While one specific log-in process is set forth herein, it should be noted that the log-in process may vary per the desires of the user. As shown, the caller identifier is initially retrieved in operation 702. Further, in operation 704, an attempt is made to identify the user in a database utilizing the caller identifier.

It is then determined in decision 706 if the user can be identified in the database based on the caller identifier. If so, the user identifier may then be looked-up in the database based on the caller identifier in an automatic log-in procedure. Note operation 710.

If not, the log-in process may further include prompting the user to manually enter the user identifier. See operation 708. This, of course, may be accomplished utilizing a speech recognition process or manual entry.

A robust system is thus provided that infers an area code of a phone number during voice activated dialing. In particular, numerous techniques are utilized to ensure accurate determination of the area code.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining an area code during voice activated dialing, comprising:
   (a) receiving utterances from the user during a session, the utterances indicative of a third party;
   (b) performing a speech recognition process on the utterances to interpret the utterances;
   (c) identifying a phone number based on the utterances;
   (d) determining whether the phone number includes an area code;
   (e) if it is determined that the phone number does not include an area code, selectively inferring the area code; from a validated caller ID and a user log-in number
   (f) outputting the inferred area code to the user;
   (g) prompting the user to confirm the inferred area code; and
   (h) dialing the phone number with the inferred area code.

2. The method as set forth in claim 1, and further comprising executing a log-in process.

3. The method as recited in claim 2, wherein the log-in process includes collecting a caller identifier.

4. The method as recited in claim 3, wherein the log-in process further includes attempting to identify the user in a database utilizing the caller identifier.

5. The method as recited in claim 4, wherein the log-in process further includes determining if the user is identified in the database based on the caller identifier.

6. The method as recited in claim 5, wherein the log-in process further includes prompting the user to enter a user identifier upon it being determined that the user can not be identified in the database based on the caller identifier.

7. The method as recited in claim 6, wherein the log-in process further includes identifying the user identifier based on the caller identifier upon it being determined that the user can be identified in the database based on the caller identifier.

8. The method as set forth in claim 7, and further comprising obtaining an address book associated with the user based on the user identifier.

9. The method as set forth in claim 8, and further comprising determining whether the utterances indicative of the third party are representative of a name of the third party.

10. The method as set forth in claim 9, and further comprising looking up the phone number associated with the name in the address book if it is determined that the utterances indicative of the third party are representative of a name of the third party.

11. The method as set forth in claim 10, and further comprising determining whether the utterances indicative of the third party are representative of a phone number of the third party.

12. The method as set forth in claim 11, and further comprising determining whether the phone number includes 10-digits.

13. The method as set forth in claim 12, and further comprising dialing the phone number if the phone number includes 10-digits.

14. The method as set forth in claim 13, and further comprising determining whether the caller identifier is valid if the phone number includes 7-digits.

15. The method as set forth in claim 14, and further comprising inferring an area code from the caller identifier if the caller identifier is valid.

16. The method as set forth in claim 15, and further comprising inferring the area code from the user identifier if the caller identifier is invalid.

17. The method as set forth in claim 16, wherein the user identifier includes a phone number of the user.

18. A computer program product for determining an area code during voice activated dialing, comprising:
   (a) computer code for receiving utterances from the user during a session, the utterances indicative of a third party;
   (b) computer code for performing a speech recognition process on the utterances to interpret the utterances;
   (c) computer code for identifying a phone number based on the utterances;
   (d) computer code for determining whether the phone number includes an area code;
   (e) computer code for selectively inferring the area code from a validated caller ID and a user log-in number if it is determined that the phone number does not include an area code; from a validated caller ID and a user log-in number
   (f) computer code for outputting the inferred area code to the user;
   (g) computer code for prompting the user to confirm the inferred area code; and
   (h) computer code for dialing the phone number with the inferred area code.

19. A system for determining an area code during voice activated dialing, comprising:
   (a) logic for receiving utterances from the user during a session, the utterances indicative of a third party;
   (b) logic for performing a speech recognition process on the utterances to interpret the utterances;
   (c) logic for identifying a phone number based on the utterances;

(d) logic for determining whether the phone number includes an area code;

(e) logic for selectively inferring the area code from a validated caller ID and a user log-in number if it is determined that the phone number does not include an area code;

(f) logic for outputting the inferred area code to the user;

(g) logic for prompting the user to confirm the inferred area code; and (h) logic for dialing the phone number with the inferred area code.

20. A method for determining an area code during voice activated dialing, comprising:

(a) receiving utterances from the user during a session, the utterances indicative of a third party;

(b) performing a speech recognition process on the utterances to interpret the utterances;

(c) logging the user include utilizing a user identifier;

(d) identifying a phone number based on the utterances;

(e) determining whether the phone number includes an area code;

(f) if it is determined that the phone number does not include an area code, determining whether a validated caller identifier associated with the session;

(g) inferring the area code based on the caller identifier if the caller identifier is valid;

(h) inferring the area code based on the user identifier if the caller identifier is invalid;

(i) outputting the inferred area code to the user;

(j) prompting the user to confirm the inferred area code; and (k) dialing the phone number with the inferred area code upon the receipt of confirmation from the user.

21. A method for determining an area code during voice activated dialing, comprising:

(a) identifying a phone number utilizing speech recognition;

(b) determining whether the phone number includes an area code;

(c) if it is determined that the phone number does not include an area code, from a validated caller ID and a user log-in number selectively inferring the area code;

(d) outputting the inferred area code to the user;

(e) prompting the user to respond to the inferred area code; and (f) dialing the phone number with the inferred area code based on the response.

* * * * *